Figure 1:
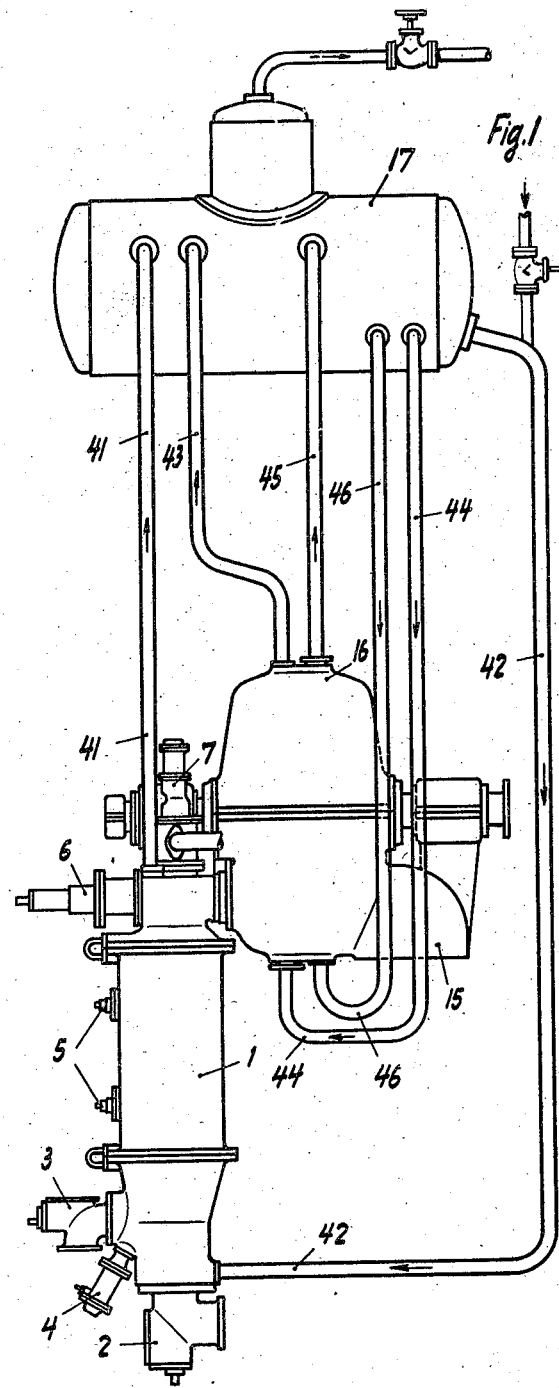

Patented Jan. 5, 1943

2,307,042

UNITED STATES PATENT OFFICE 2,307,042

COOLING OF COMBUSTION TURBINE PLANTS

Hans Holzwarth, Dusseldorf, Germany, assignor to Holzwarth Gas Turbine Co., San Francisco, Calif., a corporation of Delaware Application May 9, 1939, Serial No. 272,601
In Germany March 9, 1935

18 Claims. (Cl. 60—41)

The present invention relates to the cooling of various parts of a combustion turbine plant, and particularly of a constant volume explosion turbine plant.

This application is a continuation-in-part of my copending application, Ser. No. 65,041, filed February 21, 1936.

It is the general object of the invention to provide a reliable and economical method of cooling the highly heated parts of a combustion turbine plant. More specifically, it is an object of the invention to provide an improved method of cooling the heated walls of an explosion turbine plant whereby the abstracted heat is caused to produce a readily utilizable working medium, for example high pressure steam, while at the same time the cooling is effected primarily by means of a liquid, such as water.

Although, as will be evident from the following description, various liquids may be employed as the cooling agent, I shall hereinafter describe the use of water by way of example, water being at the same time the cheapest and one of the safest substances.

The problem of cooling is a particularly difficult one in the case of an explosion turbine because of the high average temperature level of such a plant and because of the frequently constricted and tortuous character of some of the cooling jackets, which favor the formation of steam pockets. Although the generation of steam in the jackets offered a simple way of abstracting large quantities of heat with a small amount of water, because of the large amount of latent heat of vaporization absorbed, this advantage was counterbalanced (and even more than counterbalanced, since safety is a prior prerequisite even to economy) by the fact that the steam tended to collect in pockets and, being a poorer conductor of heat than water, practically insulated the walls against further cooling, with resulting danger of destruction of the heated walls. This insulating action of the formed steam was much more serious than in an internal (piston) combustion engine because in a gas turbine with constant volume combustion, far greater amounts of heat must be withdrawn per unit of time by reason of the high temperature, high velocity (which in places is above the critical velocity and causes disproportionately increased heat transmission) and high pressure of the gases. According to prior teachings and experience, therefore, the generation of steam in the jackets of an explosion turbine had to be prevented at all costs.

The proper utilization of the heat withdrawn from the walls is, however, highly important in stationary explosion turbines, and in large part determines the ability of this type of turbine plant to compete with the highly developed power plants now in common use. A higher proportion of the total heat content of the fuel is transmitted to the cooling agent in explosion turbines than, for example, in piston combustion engines, because of the higher average wall temperatures. This gave rise to a peculiarly paradoxical situation; for while the higher wall temperature level in explosion turbines offered the possibility of utilizing efficiently the withdrawn heat at high temperature ranges, that is, by the production of high pressure steam, it at the same time forbade the production of steam in the cooling jackets because this higher wall temperature, and with it the higher rate of heat transfer, required the continuous flow of a cooling agent of high heat absorbing capacity.

There appeared to be no way of escaping the dilemma and resort was therefore had to keeping water in the cooling jackets below its vaporization point, accepting as unavoidable the circulation of large volumes of water and less efficient utilization of the absorbed heat.

I have found that if the circulation of excessively large volumes of water is to be avoided, at least 2% of the water must be converted into steam upon discharging from the cooling jackets. At elevated pressures the heat of vaporization of 1 kg. of water is approximately 500 kg.-cal. (Cal.). With 2% vaporization, about 10 kg.-cal. would accordingly be converted into heat of vaporization per kg. of water. The cooling effect is thus only equivalent to increasing the temperature of 1 kg. of cold water by 10° C. For this reason the effort was made by me to obtain a higher degree of steam vaporization, and at the same time eliminate any insulating effect of the steam on the heated walls of the plant.

The present invention provides an improved method and apparatus for the cooling of explosion turbine plants whereby the seemingly contradictory conditions of large steam generation in the cooling jackets and continuous cooling of the heated walls with water are established.

I have found that under proper conditions of pressure and rate of flow, such a violent state of whirling can be set up in the cooling jackets by the vaporization of part of the water, that a very intimate mixture of water and steam is produced from which the steam does not tend to separate in the jackets, the mixture on the other hand sweeping droplets of water continuously along the walls to be cooled. The cooling is thus essentially one by water. To this end it is important to limit the degree of vaporization to an extent, depending on the pressure conditions, such that the water and steam remain in substantially uniform mixture as they pass through and discharge from the jackets. I have found that in the case of water, the maximum desirable degree of vaporization is that represented by a steam volume which is about 15 times that of the water flowing through the jackets, and in order that the volume of water circulated be kept within economical limits, the steam generated should be at least about 2% by weight of the water. Within the limits of 2% vaporization of the water and a maximum of 15 volumes of steam for each volume of water leaving the cooling jackets, there appears to occur such strong whirling that the unvaporized water is carried along in the form of more or less uniformly distributed drops suspended in the steam. To maintain the steam and water in the form of an intimate mixture, it is important that at least one discharge opening be located at the highest point of each cooling jacket in order to maintain the steam in a condition of flow throughout all of the jackets, and thereby prevent separation between steam and water.

The regulation of the steam generation within the limits given above can be realized only at higher pressures; only above 2.4 atmospheres absolute does a 2% vaporization yield steam of less than 15 times the volume of the water. I prefer to operate with a vaporization of 6% in order to reduce still more greatly the amount of water that must be circulated. In such case, the pressure must be at least 8 atmospheres absolute in order to keep the steam volume less than 15 times that of the water which flows with it. In order to provide a factor of safety, the cooling is best carried out at pressures above 10 atmospheres absolute.

My researches on the problem of cooling of explosion turbines have led further to the discovery that a large part of the disturbances encountered when the water is permitted to evaporate in the cooling jackets was due to the non-uniform vaporization conditions on discharge from the various cooling jackets. These disturbances are reduced by operation under the conditions above described and, in accordance with a further development of the invention, their prevention is still further insured by employing parallel cooling circuits for the different parts of the plant to be heated, so that water of substantially the same temperature is charged to each of the jackets the degree of steam formation in the different cooling jackets being controlled by regulation of the flow through the jackets in dependence upon the amount of heat to be withdrawn in the individual jackets, as by suitably dimensioning the passageways, by the use of separate circulating pumps, or by both measures. The resistance of any circuit is thus without influence on the water supply to the other circuits. When the heat conditions of two or more parts are approximately the same, they may be connected in parallel in the same circuit; but, in general, parts of different temperatures or rates of heat transmission will be arranged in separate circuits each having its own propulsion force, either thermosiphonic or mechanical.

Figure 2:
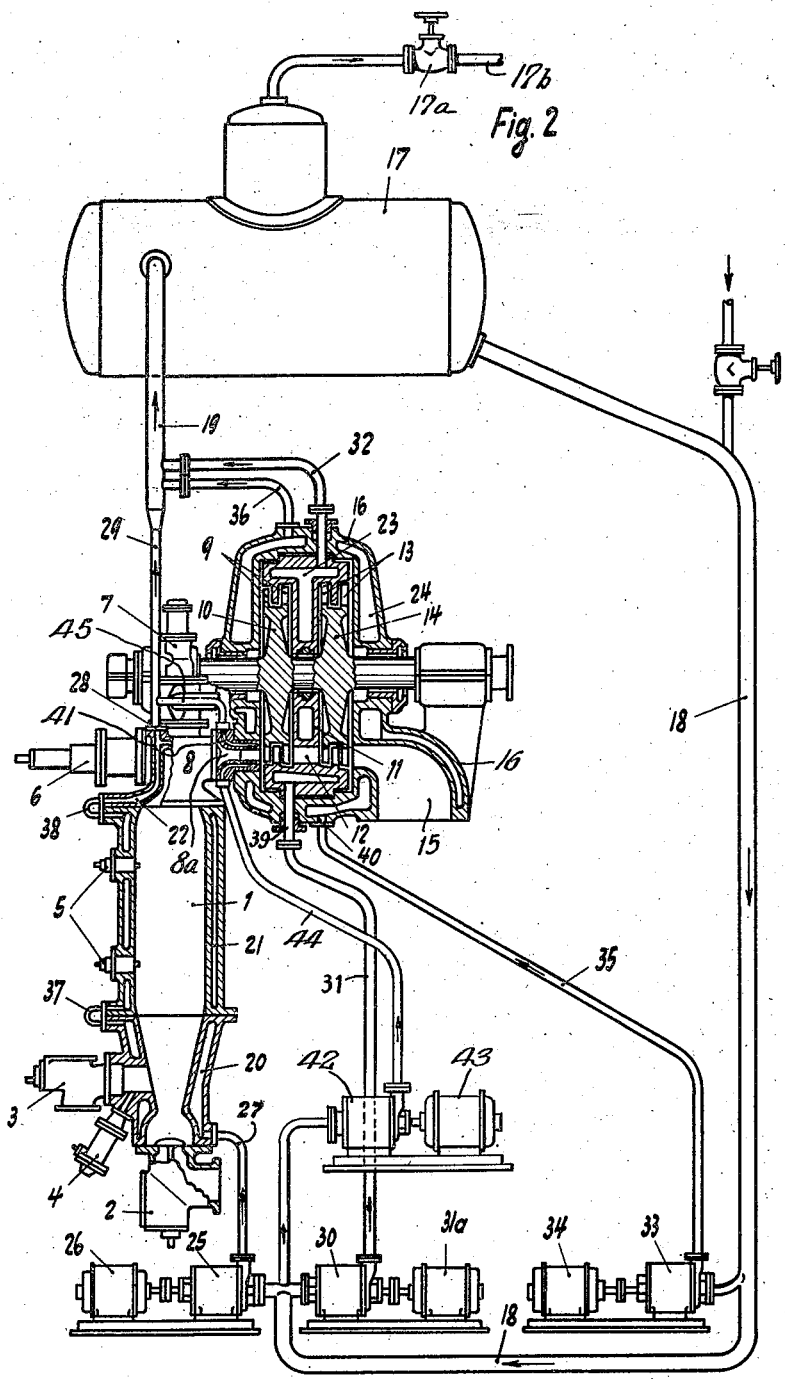

The above and other features of the invention will be described in greater detail in connection with the accompanying drawings which illustrate by way of example two satisfactory embodiments of the present invention in explosion turbine plants. In said drawings, Fig. 1 shows schematically a view of a plant in which the cooling circuits are provided by mutually independent and separate sets of riser and descending tubes;

Fig. 2 shows in vertical section a view through an explosion turbine plant in which the several cooling circuits are placed under the required circulating pressure independently of each other by means of separate pumps or pump sections provided for each circuit.

Referring to Fig. 1, the combustion plant illustrated is an explosion turbine plant comprising, among other things, the explosion chamber 1 having the operating parts 2, 3, 4, 5, 6 and 7 which are described more in detail in connection with Fig. 2, and including also the rotor housing 16 and the intermediate walls located between the individual rotors referred to more specifically hereinbelow. The explosion turbine plant presents a series of parts under different heat conditions so that these parts may be arranged ordinarily neither in series nor in parallel in the cooling water circuit. Their arrangement in series is disadvantageous because the cooling agent then travels from cooling chamber to cooling chamber until, after it has left the last chamber in the series, it is introduced into a boiler or other device where the absorber heat is utilized. The cooling agent thus becomes hotter and hotter as it travels through the successive chambers, and, other things being equal, the rate of heat absorption falls as the temperature of the cooling agent increases. However, in certain practical arrangements of the various parts of the plant it often becomes necessary to introduce later in the circuit a heated member which requires a higher rate of heat abstraction than one earlier in the series. Thus, the nozzle channels 8a (see Fig. 2) leading from the explosion chambers to the nozzle 8 of the explosion turbine must be more vigorously cooled, than, for example, the turbine housing and even the explosion chambers, because in such channels the gases flow at very high velocities. Hence, a rate of flow or a flow pressure which was adequate for cooling the explosion chamber or turbine housing economically might be inadequate for the nozzle channel and endanger the latter.

A parallel flow arrangement is likewise incapable of insuring an adequate degree of cooling for all under all conditions because the cooling agent tends to flow through the cooling jacket of least resistance, so that the other parts are not properly cooled.

Because the temperature and velocity of the combustion gases, among other factors, are different at different parts of the turbine, the quantity of heat to be withdrawn per unit of area varying considerably throughout the turbine (these heat quantities depending also on the thickness of the walls and on the heat conductivity of the material), the parts to be cooled are under different heat conditions. According to the invention, the heat receiving medium is conducted to such parts through several circuits which are subjected automatically to the circulating pressure required by the individual circuits and are thus independent of each other, each or an associated group of the combustion engine parts being associated with one of these circuits. To this end the cooling spaces of the explosion chamber 1 of Fig. 1 are connected with the separator 17 through a riser conduit 41 and a descending conduit 42 which are completely separate from the other riser and descending conduits of the system. A further set of riser and descending conduits 43 and 44, completely separate from the other circuits, connects the cooling chambers of the intermediate wall between the turbines (which is visible in Fig. 2) with the separator 17; while, finally, a third completely separate set of riser and descending conduits 45 and 46 connects the cooling spaces of the rotor housing with the separator 17. Due to the completely separate construction of all of the riser and descending conduits, the specific heat differences of the cooling agent which must occur in the separate riser and descending conduits are brought into action in such manner that the individual combustion engine parts are swept by streams of cooling agent whose heat-absorbing capacities vary, and whose necessary speeds of circulation are independent of each other. In this manner, the difficulties are removed which occur in a purely series arrangement of the parts to be cooled and likewise in the usual parallel arrangement of the cooling chambers with a common source of circulating cooling agent.

The use of independent cooling agent circuits, as shown in Fig. 1, has the important advantage over known arrangements wherein the parts to be cooled are traversed in parallel by one circulating stream, that is, a single complete circuit, that the degree of cooling of one part is not affected by the higher or lower resistance to flow in the cooling jacket of another part.

By the arrangement described, a satisfactory cooling of a combustion engine plant by circulation of one and the same cooling agent which evaporates in part as it absorbs heat is effected. As shown in Fig. 1, the heat-receiving or cooling agent is conducted to parts of the combustion engine plant, which are heated to different degrees, through several circuits which are at the required circulating pressure heads independently of each other, a different circuit being associated with each of the combustion machine parts or groups of parts. Such a process and arrangement are not subject to the disadvantages of a series arrangement of the cooling chambers within a single cooling agent stream. The arrangement can in the case of each combustion engine part to be cooled be so determined that the cooling agent is withdrawn at the uppermost point of the cooling jackets, the position of the individual combustion engine parts with reference to each other, determined by constructional considerations, causing no difficulties at all. The formed vapor is thus free to move upwardly, and vapor pockets with consequent insulation of heated parts against cooling and disturbance of circulation, are avoided. The undesirable enlargement of the inlet, through, and outlet passageways for the cooling agent heretofore found necessary to insure proper flow of the vapor, and the uncertainty in connection with the dimensions thereof, are thus eliminated. As contrasted with the parallel arrangement of the cooling jackets with mutual dependence of the cooling agent streams through the parts arranged for them in common, in which for the most part the pressure increase is produced, the advantage arises that the quantity of cooling agent flowing through the individual jackets is more independent of the flow resistance.

As explained hereinabove, the invention contemplates providing such conditions in the cooling jackets that the generated steam forms a relatively stable mixture with the water which by continuous whirling is brought into contact with the hot walls so that in effect a cooling essentially by water is maintained. To this end provision is made that at least 2% and preferably about 6% by weight of the water is evaporated under such pressure that the steam volume does not exceed about 15 times the volume of the water flowing through the jackets. To this end the rate of water flow through the jackets is made to depend upon the quantity of heat which is to be absorbed and is established by suitable dimensioning of the jackets in view of the thermosiphonic head. The most advantageous dimensions and relationships for any given plant can be determined by simple experiment. The proper pressure can be maintained in the cooling system by providing a pressure regulating valve 17a in the steam line 17b which conducts the steam to a place of use, for example, a steam turbine which may drive the air compressor of the plant, a generator, etc.

A more positive regulation of the steam generation in the cooling jackets, and especially for the purpose of insuring approximately equal degrees of steam generation in the different jackets under the limiting conditions above discussed can be obtained by the apparatus shown in Fig. 2.

Fig. 2 shows a modified form of the invention, the explosion chamber 1 being shown in section, a second chamber being located behind such chamber, but being completely covered by the latter. The two chambers are designed and arranged to discharge their combustion gases to the same rotor and are of identical construction. Each of the chambers has associated therewith a scavenging air valve 2, a fuel inlet valve 4, a charging air valve 3, ignition elements in the form of spark plugs 5, a nozzle or outlet valve 6 controlling the discharge of the explosion gases to the nozzles 8, and an auxiliary discharge valve 7. The operation of the chamber is well-known and may briefly be described as follows: The chamber 1 receives air under ignition pressure through the valve 3 and a charge of fuel through the valve 4. All the valves being closed, the combustible mixture in the chamber is ignited by the spark plugs 5. When the combustion is complete, the hot gases at explosion pressure are discharged through the nozzle valve 6 and enter the nozzles 8 which direct them against the blades 9 of the rotor 10. The hot gases leaving the rotor 10 enter the nozzles 12 arranged in the intermediate wall 11 and then impinge the blades 13 of the rotor 14, and finally leave the plant through the discharge conduit 15 in the housing 16. After the expansion of the gases is ended, the nozzle valve 6 is closed and the auxiliary outlet valve 7 is opened. The latter connects the explosion chamber 1 with a group of nozzles (not shown) which direct the low pressure residual gases directly against the blades 13 of the rotor 14. Substantially simultaneously with the opening of the outlet valve 7, the scavenging air valve 2 is opened so that the entering scavenging air expels the residual hot combustion gases through the valve 7. Upon completion of the scavenging, the valves 2 and 7 are closed, the charging air valve 3 opened and the cycle begins anew.

In the cooling of the explosion turbine plant just described, the water contained in the separator 17 flows through a conduit 18 to circulating pumps which force the water under pressure into the cooling jackets of the parts to be cooled where it is partially evaporated. The conduits 29, 32 and 36 for the heated cooling agent may be connected by way of a common return conduit 19 with the separator 17.

As already explained, a combustion plant such as that shown in Fig. 2 will have a number of parts at different cooling agent temperatures so that for reasons of safety and economy these parts may not, with reference to parts 17, 18 and 19 of the circuit, be arranged either in series or in parallel with a single circulating pump. These cooled parts include especially the explosion chamber 1 which has the cooling jackets 20, 21 and 22, connected by the pipes 37 and 38; the intermediate wall 11 with the cooling chamber 23 and the turbine housing 16 with the cooling jacket 24. The cooling of the jackets 20 to 24 occurs in the following manner:

The heat absorbing agent is conducted to the machine parts 1, 11, 8 and 8a, and 16 by way of a number of independent circuits, a separate circulating system being associated with each of these parts. In one of the circuits are contained the cooling jackets 20, 21 and 22 of the explosion chamber or chambers, to which the cooling agent is forced by the pump 25, driven by the motor 26, through the pipe 27. The pump 25 receives the cooling agent from the pipe 18. The cooling agent discharged at the opposite end of the chamber at 28 passes through pipe 29 to the collecting conduit 19.

The second cooling agent circuit includes the cooling jacket 23 of the intermediate wall 11, such cooling jacket including also the reversing blades, the cooling agent being charged thereinto by the pump 30 by way of the pipe 31 which enters the housing at 39. An electric motor 31a drives the pump 30, the latter receiving the cooling agent from the pipe 18, while the heated cooling agent passes through pipe 32 into the conduit 19.

In the third circuit is contained the cooling jacket 24 of the housing 16. The pump 33, driven by the electric motor 34, forces the cooling agent through pipe 35 and opening 40 into the cooling space 24, the heated cooling agent being withdrawn by pipe 36 and flowing into the conduit 19.

Similarly the fourth circuit charges cooling agent into the jacket 41 surrounding the nozzle channel 8a and nozzles 8, the cooling agent being circulated by the pump 42 which is driven by motor 43; the cooling agent entering the jacket through pipe 44 and leaving it by pipe 45 which connects with the pipe 29.

The four separate and independent cooling agent circuits accordingly consist respectively of the parts 18, 25, 27, 20, 21, 22, 28, 29, 19, 17, 18; parts 18, 30, 31, 39, 23, 32, 19, 17 and 18; the parts 18, 33, 35, 40, 24, 36, 19, 17 and 18; and the parts 18, 42, 44, 41, 45, 29, 19, 17 and 18. Thus each circuit cools a separate group of parts of the plant. Only in the explosion chamber 1 are the individual jackets 20, 21 and 22 arranged in series. These parts, however, due to their constructional arrangement are positioned one above the other, so that in these parts the danger of steam nest formation does not occur. In addition, the cooling jackets and the connecting conduits 37 and 38 can be so dimensioned with a view to the other requirements without limitation by the constructional conditions that the increasing heat absorption is taken into consideration. On the other hand, it will be noted that the discharge opening for the cooling agent at the head of the explosion chamber is higher than the inlet openings 39 and 40 for the second and third circuits so that a reversal of the water-steam mixture in the downward direction would have been necessary if the cooling jackets had been connected one after the other in series. There would, therefore, have arisen the possibility of the formation of steam pockets. To insure a positive and continuous flow through the individual circuits there is arranged for each circuit, according to the invention, a separate circulating pump 25, 31 or 33. The pump 25, as already stated, cools the two similarly constructed explosion chambers 1 since the cooling conditions of the two chambers, leaving out of consideration any abnormal disturbances, are the same, so that the danger which exists in the case of dissimilar cooling agent temperature conditions does not arise in the parallel arrangement of the cooling spaces associated with these two explosion chambers.

The temperature of the cooling agent of the intermediate wall 11 requires special care because such wall, together with the stationary reversing blades, is surrounded upon all sides by rapidly flowing, very hot gases, so that the heat stresses thereon are extremely high. For this reason the cooling agent circuit 18, 30, 31, 23, 19, 17, 18 is preferably operated with a circulating pressure which is higher than that produced by the pumps 25 and 33.

In fact, in accordance with the invention, the size of the cooling jackets and of their inlet and outlet openings, and the pump pressures are so determined that at least about 2% and preferably about 6% of the water in the jackets is converted into steam while such a pressure is maintained (as by a suitable regulating valve 17a in the steam discharge line 17b), above about 2.4 atm. abs. and preferably over 8 atm. abs. when 6% evaporation is provided for, that the steam volume does not exceed about 15 times the water volume discharging from the cooling jackets.

As will be seen from the above, the use of separate vertical riser and descending conduits, and the arrangement of special pumps or pump sections separately connected with the associated cooling jackets have in common the feature that by the use of a plurality of cooling agent circuits which are independent of each other, each circuit withdrawing heat separately from parts of the combustion engine plant allotted thereto, such as combustion chambers, turbine housing, separating wall between rotors, connecting channels, etc., such parts being in different conditions of heating, adequate and safe cooling of the different parts is attained.

The present invention is obviously not limited to the specific arrangement shown on the drawings, as many variations can be resorted to without departing from the spirit and principles of the invention.

I claim:

1. The method of cooling the jacketed combustion chamber of a combustion turbine plant, which comprises charging a cooling liquid into the jacket about said chamber at approximately the lowest point of the jacket, maintaining the liquid in the jacket in a state of substantially continuous flow and so regulating the flow of the liquid through the jacket in dependence on the rate of heat withdrawal and maintaining such an elevated pressure that a limited volume of vapor is produced, representing at least about 2% of the circulating liquid by weight but sufficiently small to be capable of forming a relatively uniform and non-separating mixture with the unvaporized liquid; said liquid being brought by the whirling vapor into contact with the heated walls, whereby cooling by liquid is maintained in spite of the vapor formation; withdrawing the mixture of liquid and vapor at approximately the highest point of the jacket and conducting such mixture to a separator; withdrawing the separated vapor, and returning the unvaporized liquid, at approximately its boiling point, to the said lowest point of the jacket.

2. The method of cooling a highly heated jacketed part of an explosion turbine plant, which comprises charging water into the jacket about said part at such a rate and at such an elevated pressure that at least about 2% of the water entering the jacket is vaporized therein but the volume of the vapor does not exceed about 15 times that of the water.

3. The method according to claim 2 wherein the pressure is maintained at at least 8 atmospheres absolute.

4. The method according to claim 2 wherein about 6% of the water is vaporized and the pressure is maintained at at least 8 atmospheres absolute.

5. The method according to claim 2 wherein at least about 6% of the water is vaporized and the pressure is maintained over 10 atmospheres absolute.

6. The method of cooling separately jacketed parts of a combustion turbine plant, which comprises charging water under elevated temperature and pressure to the several jackets in separate streams having independent sources of pressure head, the water being charged into the jackets at a temperature approximating the boiling point thereof at such pressure, and causing the liquid to flow through the jackets at such a rate that at least about 2% by weight of the water within the jackets is vaporized within the jackets, the pressure being maintained at such a value that the volume of steam is no more than about 15 times that of the water flowing therewith, collecting the streams of mixed water and steam, separating the steam, and re-conducting the residual water into the cooling jackets.

7. The method according to claim 6, wherein the pressure of the water as it enters the cooling jackets is above 2.4 atmospheres absolute.

8. The method according to claim 6, wherein the pressure of the water as it enters the cooling jackets is at least about 6 atmospheres absolute.

9. The method according to claim 6, wherein the pressure of the water as it enters the cooling jackets is at least about 10 atmospheres absolute.

10. The method according to claim 6, wherein the water is forced through each of the jackets at a pressure determined by the resistance of the circuit including the individual jackets and the amount of heat to be withdrawn in the respective jackets.

11. Apparatus for cooling the several parts of an explosion turbine plant which are at different heat conditions during the operation of the plant, comprising separate cooling jackets about the different parts of the plant to be cooled, separate cooling circuits for the separate cooling jackets, each including one of such jackets, a common vapor separator forming part of each cooling circuit and connected with the discharge end of the said jackets, said circuits each including a discharge conduit running from the outlet of the jacket to the separator and a supply conduit running from the latter to the inlet of the jacket and supplying cooling liquid at approximately its boiling point, and means for maintaining a superatmospheric pressure in the jackets, the rate of flow and the pressure being at such values that at least about 2% of the cooling liquid is vaporized but no more than will yield a volume of vapor equal to 15 times that of the liquid, whereby the circulating body of liquid is kept small, while a substantially uniform mixture of liquid and vapor is formed in the jackets and separation of vapor prevented therein.

12. Apparatus according to claim 11, wherein the inlets and outlets of the jackets are connected to the vapor separator in such manner that the proper degree of flow through the separate jackets is maintained by the thermosiphonic action.

13. Apparatus according to claim 11, wherein a separate power unit circulates the cooling liquid through the individual cooling circuits, and at such rates that at least 2% of the liquid is vaporized in the jackets.

14. Apparatus according to claim 11, wherein a separate power unit circulates the cooling liquid through the individual cooling circuits at a pressure of at least 8 atmospheres absolute and at such a rate that about 6% of the liquid is vaporized in each of the jackets.

15. Apparatus according to claim 11, wherein the connections to the jackets are so located that the liquid and liquid-vapor mixture are afforded a continuously upward path.

16. Apparatus for cooling the several parts of an explosion turbine plant including the explosion chamber, nozzles and turbine housing which are at different heat conditions during the operation of the plant, with a liquid cooling agent which is brought to a temperature above its boiling point at atmospheric pressure, comprising a separator for separating vapor under pressure, a conduit for conducting the vapor to a place of use, separate cooling jackets about the different parts of the plant to be cooled, said jackets being out of direct communication with each other, and separate circulating circuits for cooling agent associated with each cooling jacket but having the separator in common and conducting to the jackets the liquid from the separator in separate streams at a rate to effect the required degree of cooling, said circuits each having a pressure head through its jacket determined by the degree of heating of the associated part of the plant and including an inlet tube of higher pressure supplying unvaporized liquid from the separator, at approximately its boiling point, to the jacket and connected to the latter at approximately its lowest point, and a discharge tube of lower pressure connected with its jacket at approximately the highest point of the latter, the inlet tubes of the circuits being out of communication with each other to cause the full pressure head to be effective upon each cooling jacket and thereby insure adequate flow therethrough, and means comprising a pressure control valve in the vapor discharge conduit of the separator for maintaining in the system a pressure such that, at the existing rate of flow through the jackets, at least 2% of the liquid is vaporized but no more than will yield a volume of vapor equal to 15 times that of the liquid, whereby the volume of circulating liquid is kept small while a substantially uniform mixture of liquid and vapor is formed in the jackets.

17. The method of cooling separately jacketed parts of a combustion turbine plant which are subjected to different degrees of heating, with a liquid cooling agent which is brought to a temperature above its normal boiling point, which comprises circulating separate streams of cooling agent through the separate jackets under independent pressure heads whose magnitudes are determined by the resistances of the respective circuits, conducting the heated cooling agent from all of the circuits to a common separator, and charging cooling agent from the separator into each cooling circuit in advance of the associated part to be cooled, the cooling agent being introduced into the cooling jackets at such temperatures and at such a rate that vapor is produced within the jackets, whereby the specific gravity of the fluid in the jackets and behind them is reduced and circulation of cooling agent through the circuits thereby promoted, the rate of flow and pressure being maintained at such values that at least 2% of the liquid is vaporized in the jackets and the unvaporized cooling agent leaves the jackets suspended in a volume of vapor no greater than about 15 times the volume of the liquid discharging therewith.

18. Apparatus according to claim 11, including a discharge conduit for the separated vapor connected to the separator, the means for maintaining a superatmospheric pressure in the jackets comprising a control valve in said discharge conduit.

HANS HOLZWARTH.